Aug. 29, 1939.  J. C. TARBELL  2,170,879
BOLSTER
Filed April 3, 1937
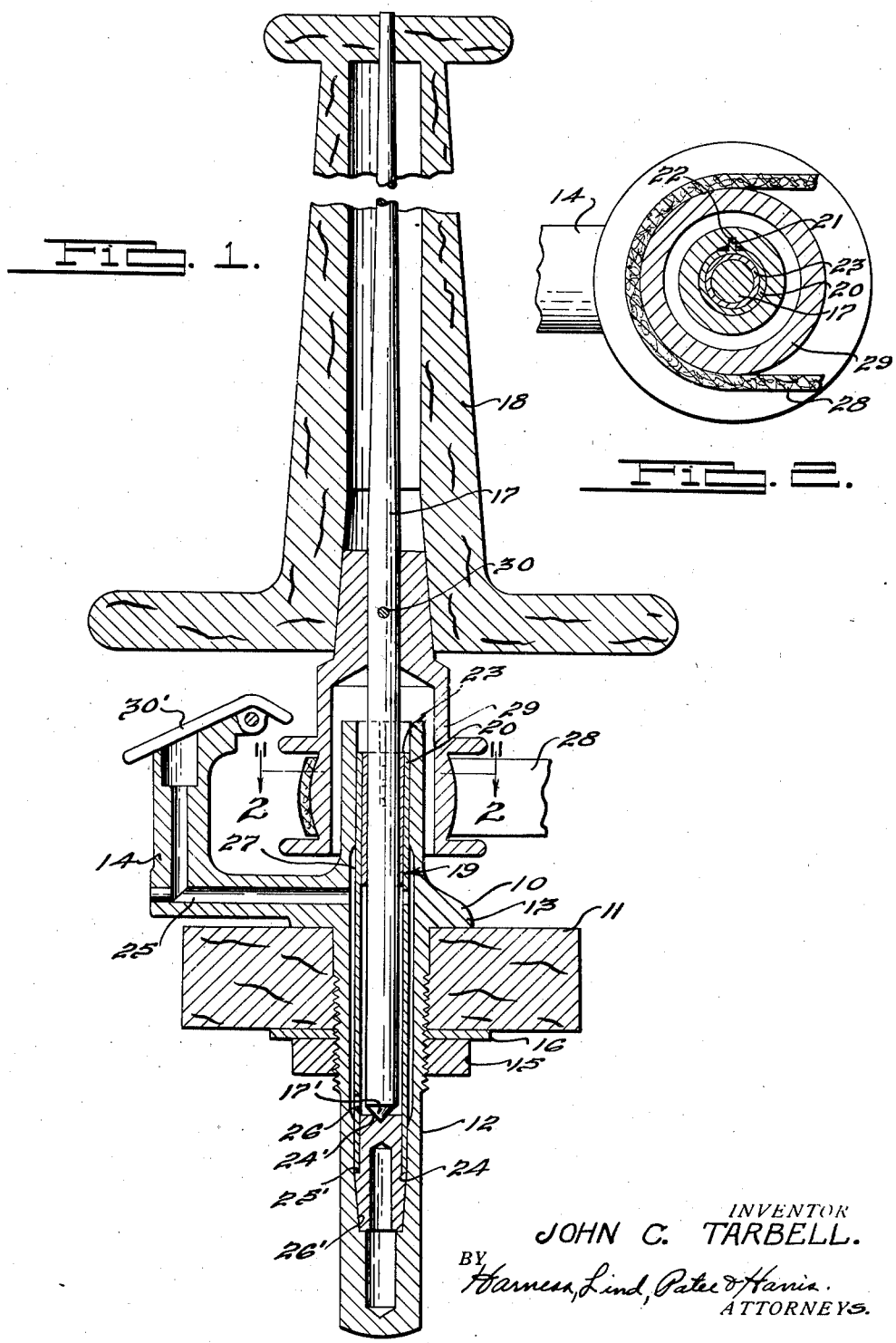
INVENTOR
JOHN C. TARBELL.
BY
Harness, Lind, Patee & Harris.
ATTORNEYS.

Patented Aug. 29, 1939

2,170,879

UNITED STATES PATENT OFFICE 2,170,879

BOLSTER

John C. Tarbell, Springfield, Mass., assignor to Chrysler Corporation, Highland Park, Mich., a corporation of Delaware Application April 3, 1937, Serial No. 134,721

1 Claim. (Cl. 308—149)

This invention relates to an improved bolster and more particularly to a bolster for a spool supporting spindle.

An object of the invention is the provision of a bolster comprising bearing portions formed of a material having a substantially large absorbed lubricant content.

Another object of the invention is to provide a fabricated bolster having spaced internal bearing portions which may be independently formed of bearing material and to a desired construction, and thereafter assembled in a bolster body portion composed of non-bearing material.

Another object of the invention is the provision in conjunction with a bolster of the above type of an improved construction and arrangement of the bolster and associated parts so that lubricant can be supplied to and absorbed by the bolster bearing portions.

Another object of the invention is the provision in an apparatus including a support and a rotary member to be supported thereby, of a bolster having one of its bearing portions so constructed and arranged as to cooperate with the support member for accurately positioning the rotary member with respect to the latter.

Other objects and advantages of the invention will be more apparent from the following description taken in connection with the accompanying drawing, in which:

Fig. 1 is a longitudinal vertical sectional view of a spool supporting apparatus comprising a bolster embodying the invention.

Fig. 2 is a horizontal sectional view taken on the line 2—2 of Fig. 1.

The improved bolster is illustrated and described in connection with a spool supporting spindle and mounting therefor, the spool and spindle being adapted for rotation relative to the support at a relatively high rate of speed. The general practice is to dispose the spindle for rotation about a substantially vertical axis in a tubular support. This arrangement necessitates a bolster which will provide a journal bearing for the spindle and also an end thrust bearing for sustaining the weight of the spindle and spool mounted thereon. Preferably, the bolster bearings should be of the inherently, self-lubricated type and also capable of absorbing lubricant supplied thereto. A bolster so constructed insures adequate lubrication at all bearing surfaces.

In the embodiment of the invention illustrated, a spool supporting structure comprising a tubular bolster housing, generally designated by the numeral 10, is mounted on a support 11 having an opening through which projects an axially extending tubular supporting portion 12 of the housing structure. The bolster housing includes horizontally extending portions 13 and 14 which rest upon the upper face of the support 11. The horizontal portions 13 and 14 are clamped against the support 11 by a nut member 15 threaded on the tubular portion 12 and bearing against a washer 16 disposed between the nut and the underface of the support 11 for retaining the housing 10 in fixed position with respect to the support.

The lower end of the axially extending portion 12 is closed and the upper end thereof is open for receiving the lower end portion of a rotatable spindle 17 on which a spool 18 is mounted. Mounted in the tubular bolster housing 10 is a bolster, generally designated by the numeral 19, in which the spindle 17 is journaled for rotation about a vertical axis.

The bolster 19 includes a tube 20, preferably comprising sheet metal, having tongues 21 formed on and extending outwardly from its outer surface and engaged in a slot 22 provided in the wall of the housing for retaining the bolster against rotational displacement. A journal bearing 23 is preferably press fitted into the upper end portion of the tube 20 for journaling an intermediate part of the spindle 17 and a thrust bearing plug 24 is preferably press fitted in the lower end portion of the tube 20. The plug 24 has a reduced upper end portion disposed within the tube 20 and provided with a substantially horizontal upper extremity in which a conical recess 24' is provided for receiving and supporting a correspondingly shaped portion 17' on the lower end of the spindle 17. The walls of the conical recess 24' coact with the conical end portion 17' of the spindle to maintain proper alignment between the bolster and spindle and particularly to maintain the lower portion of the latter in spaced relation to the tube 20 while providing a low friction, combined lateral and axial thrust resisting bearing surface therefor. The plug 24 has a shoulder 25' engaging the lower extremity of the tube 20 and a tapered portion projecting downwardly therefrom extending into a tapered lower end portion 26' of the passage of the tubular extension 12. The interfitting, tapered relation of the walls of the lower end portion 26' of the passage of the bolster housing and the lower end portion of the plug 24 insures accurate positioning of the bolster and spindle relative to the support.

For the purpose of providing proper lubrication for the spindle bearing surfaces as aforesaid, the bearing 23 and plug 24 are preferably formed from a porous metal comprising a compressed and sintered mass of powdered metals and having a substantial lubricant absorbing capacity, and through which lubricant readily permeates to the contacting bearing surfaces. By way of example, the bearing 23 and plug 24 may be produced from a mixture of powdered materials having the following composition:

|  | Per cent by weight |
|---|---|
| Powdered copper | 88.5 |
| Powdered tin | 10 |
| Powdered graphite | 1.5 |

The constituents of the mixture are thoroughly incorporated together and distributed throughout each other by a suitable mixing operation and the mixture is then compressed between dies to the desired contour of the finished product. The article so formed is then sintered at a suitable temperature in a nonoxidizing or reducing atmosphere and quenched in oil before cooling or immersed in oil after cooling to room temperature. The porosity of the product accommodates absorption of a substantial quantity of oil. It will be understood, of course, that the composition of the mixture may be varied from that set forth and that the above is merely illustrative of the constituents of the bearing material.

The bearing 23 and plug 24 will withstand a relatively long period of hard usage, but in the event of wear, either or both may be readily removed from and replaced in the tube 20, or the entire tube and bearing assembly may be removed and replaced if desired.

As a further means for insuring an adequate supply of lubricant at the bearing surfaces aforesaid, the horizontal extension 14 of the housing 10 is provided with a passage 25 communicating with the interior of the tubular portion 12 for admitting lubricant between the bolster 19 and the wall of the latter portion and through an opening 26 in the tube 20 to the bearing surface of the recess 24' of the plug 24. The passage 25 is closed by a pivotally mounted cap member 30' suitably urged to its closing position. Furthermore, the space between the inner wall of the tube 20 and the spindle 17 and between the adjacent ends of the bushing 23 and plug 24 provides a lubricant reservoir to which lubricant is admitted through the opening 26 in the tube 20. A second reservoir communicating with the aforesaid reservoir through the opening 26 is provided by the space between the outer surface of the tube 20 and the enlarged portion indicated at 27 in the opening in the housing portion 12.

The spool is driven by a suitable source of power (not shown) through a belt 28 connected with a pulley 29 non-rotatably secured to the spindle 17 by a pin 30.

What I claim is:

A bolster structure adapted to be insertably mounted as a unit in a spindle supporting bolster housing for journalling a spindle having a substantially cylindrical supported end portion comprising a substantially cylindrical sheet metal tubular body, a plug having a press fit in one end portion of said body and having an annular shoulder abutting the adjacent extremity of said tubular body and an end portion extending beyond the latter, said plug having a transverse wall provided with a recess adapted to receive an end portion of said spindle for sustaining both axial and lateral thrusts of the latter, and a bushing mounted in the opposite end portion of said tubular body and adapted to cooperate with said plug for maintaining said spindle in spaced relation to the inner wall of said tubular body, said bushing and said plug comprising a porous compressed and sintered powdered metal mass having a substantial absorbed liquid lubricant content.

JOHN C. TARBELL.